US012325499B2

(12) United States Patent
Lee et al.

(10) Patent No.: US 12,325,499 B2
(45) Date of Patent: Jun. 10, 2025

(54) SYSTEM FOR REDUCING BLADE TIP VORTEX CAVITATION BY CONTROLLING MASS FLOW

(71) Applicant: MOTH CO., LTD., Daejeon (KR)

(72) Inventors: Jae Hyung Lee, Sejong (KR); Yeong Ju Go, Daejeon (KR)

(73) Assignee: MOTH CO., LTD., Daejeon (KR)

( * ) Notice: Subject to any disclaimer, the term of this patent is extended or adjusted under 35 U.S.C. 154(b) by 0 days.

(21) Appl. No.: 18/496,944

(22) Filed: Oct. 30, 2023

(65) Prior Publication Data

US 2024/0051646 A1  Feb. 15, 2024

Related U.S. Application Data

(63) Continuation of application No. PCT/KR2022/019368, filed on Dec. 1, 2022.

(30) Foreign Application Priority Data

Jun. 15, 2022 (KR) .................. 10-2022-0072578

(51) Int. Cl.
*B63H 1/18* (2006.01)
*B63H 1/20* (2006.01)
*B63H 1/26* (2006.01)

(52) U.S. Cl.
CPC ............... *B63H 1/18* (2013.01); *B63H 1/20* (2013.01); *B63H 1/26* (2013.01)

(58) Field of Classification Search
None
See application file for complete search history.

(56) References Cited

FOREIGN PATENT DOCUMENTS

| JP | 2004009943 A | * | 1/2004 |
| KR | 10-2005-0073437 A | | 7/2005 |
| KR | 10-1226248 B1 | | 1/2013 |
| KR | 10-1661584 B1 | | 10/2016 |

OTHER PUBLICATIONS

JP-2004009943-A Machine Translation (Year: 2004).*

* cited by examiner

*Primary Examiner* — Juan G Flores
(74) *Attorney, Agent, or Firm* — NKL LAW; Jae Youn Kim (57) ABSTRACT

Disclosed is a system for reducing blade tip vortex cavitation by controlling mass flow. The system reduces blade tip vortex cavitation that occurs around blades of a propulsive propeller of a ship when the propulsive propeller rotates to generate force required to propel the ship across the sea by forming a plurality of flow holes in the propeller blades and controlling mass flow through the plurality of flow holes, i.e., appropriately discharging water to the outside or suctioning outside water through the plurality of flow holes, thereby reducing underwater noise and vibration of the hull. The system includes a propeller, a water feeding pipe, a water supply/suction unit, and a controller.

10 Claims, 5 Drawing Sheets

RIGHT ROTATION

SYSTEM FOR REDUCING BLADE TIP VORTEX CAVITATION BY CONTROLLING MASS FLOW

BACKGROUND OF THE INVENTION

Field of the Invention

The present invention relates to a system for reducing blade tip vortex cavitation by controlling mass flow, and more particularly, to technology for reducing blade tip vortex cavitation that occurs around blades of a propulsive propeller of a ship when the propulsive propeller rotates to generate force required to propel the ship across the sea by forming a plurality of flow holes in the propeller blades and controlling mass flow through the plurality of flow holes, i.e., appropriately discharging water to the outside or suctioning outside water through the plurality of flow holes.

Description of the Related Art

In modern society, due to the development of industry and transportation, a much greater number of people and goods are transported than in the past.

In particular, in countries that border the sea, for example, Korea surrounded by the sea on three sides, most goods are imported and exported by sea.

In order to import and export goods by sea, large-scale ships sail on the sea. Such a ship sails using propulsive force generated by rotation of a propeller mounted thereto, which is also called a screw.

When a propeller rotates in the water, cavitation, which is a vortex of air bubbles, occurs around the propeller. Cavitation causes noise and vibration of the hull.

Among the cavitation types that may occur around a propeller that rotates, cavitation that occurs at the tip of a blade is called blade tip vortex cavitation. Blade tip vortex cavitation is the main cause of noise and vibration of the hull.

In particular, in the case of military ships such as warships or submarines, the locations thereof may be easily exposed to the enemy due to noise generated therefrom. Therefore, military ships have a greater need to reduce blade tip vortex cavitation.

Therefore, in order to solve the above problems, the present invention proposes technology for reducing blade tip vortex cavitation that occurs around blades of a propulsive propeller of a ship when the propulsive propeller rotates to generate force required to propel the ship across the sea by forming a plurality of flow holes in the propeller blades and controlling mass flow through the plurality of flow holes, i.e., appropriately discharging water to the outside or suctioning outside water through the plurality of flow holes. Examples of related art are disclosed in the following documents.

RELATED ART DOCUMENT

Patent Document

1. Korean Patent Laid-Open Publication No. 10-2005-0073437 (entitled "METHOD AND MEANS FOR REDUCING PROPELLER CAVITATION")
2. Korean Patent Registration No. 10-1226248 (entitled "PROPELLER FOR SHIPS INCLUDING BLADES HAVING BLUNT TIPS")
3. Korean Patent Registration No. 10-1661584 (entitled "VORTEX GENERATOR FOR GENERATING ASYMMETRIC WAKE TO REDUCE PROPELLER NOISE AND VIBRATION")

SUMMARY OF THE INVENTION

The present invention has been made to solve the above problems, and it is an object of the present invention to reduce blade tip vortex cavitation that occurs around blades of a propulsive propeller of a ship when the propulsive propeller rotates to generate force required to propel the ship across the sea by forming a plurality of flow holes in the propeller blades and controlling mass flow through the plurality of flow holes, i.e., appropriately discharging water to the outside or suctioning outside water through the plurality of flow holes.

In accordance with the present invention, the above and other objects can be accomplished by the provision of a system for reducing blade tip vortex cavitation by controlling mass flow, the system including a propeller configured to discharge water to the outside or suction outside water in order to reduce blade tip vortex cavitation occurring due to rotation thereof, a plurality of water feeding pipes mounted in a propeller driving shaft so as to match corresponding ones of blades of the propeller in order to feed water to be discharged to the propeller or feed water suctioned through the propeller to water supply/suction units, a plurality of water supply/suction units mounted in the hull so as to match corresponding ones of the blades of the propeller in order to supply water to be discharged to the propeller or suction water through the propeller under the control of a controller, and a controller configured to control the plurality of water supply/suction units so that discharge and suction of water through the propeller are implemented. The plurality of water feeding pipes and the plurality of water supply/suction units are provided in the same number as the blades of the propeller.

BRIEF DESCRIPTION OF THE DRAWINGS

The above and other objects, features, and other advantages of the present invention will be more clearly understood from the following detailed description taken in conjunction with the accompanying drawings, in which.

DETAILED DESCRIPTION OF THE INVENTION

Hereinafter, embodiments of the present invention will be described in detail with reference to the accompanying drawings.

Figure 1:
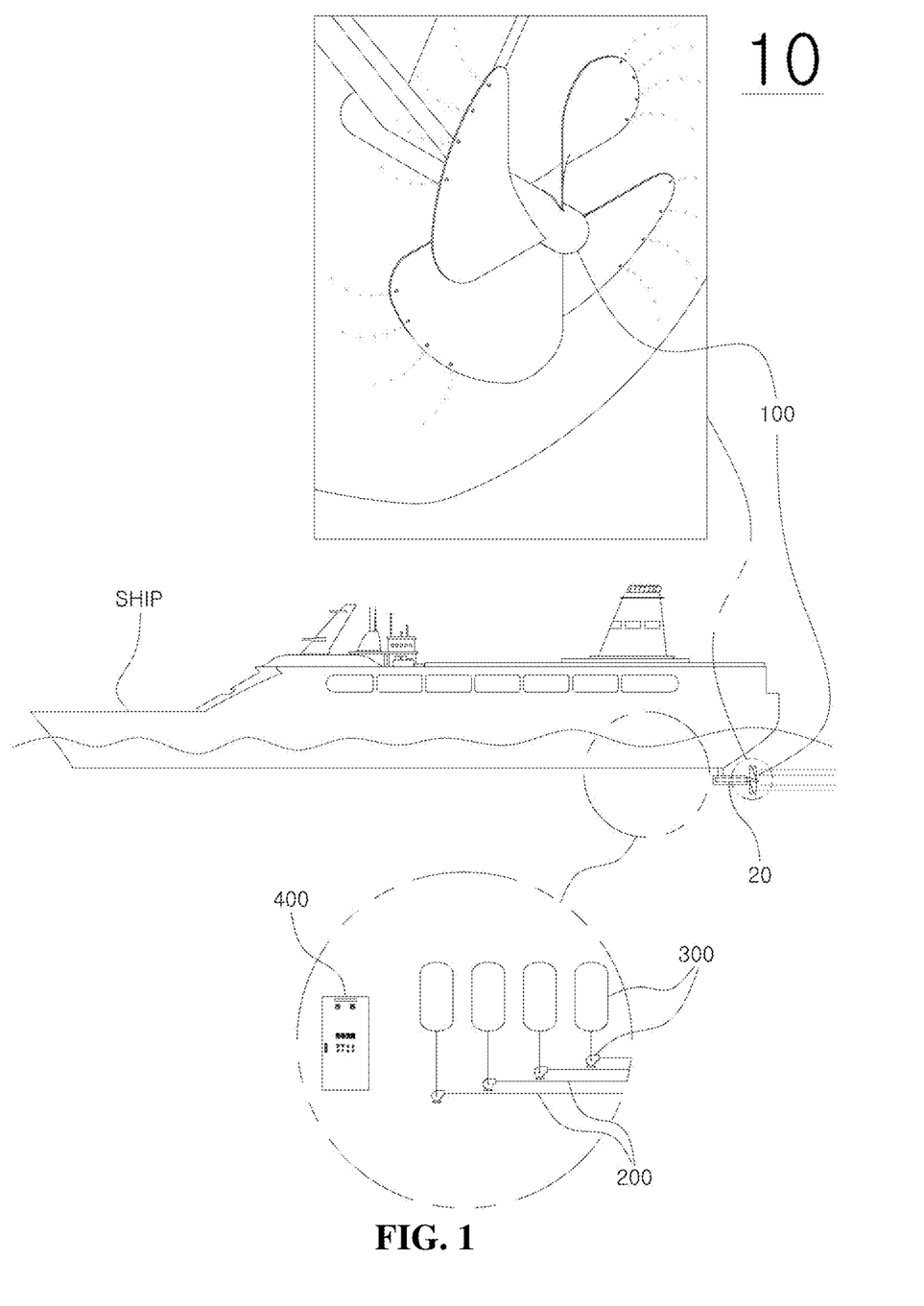
FIG. 1 is a conceptual view of the present invention.

Referring to FIG. 1, a blade tip vortex cavitation reduction system 10 through mass flow control according to the present invention reduces blade tip vortex cavitation that occurs around blades of a propulsive propeller of a ship when the propulsive propeller rotates to generate force required to propel the ship across the sea by forming a plurality of flow holes in the propeller blades and controlling mass flow through the plurality of flow holes, i.e., appropriately discharging water to the outside or suctioning outside water through the plurality of flow holes, thereby reducing underwater noise and vibration of the hull. The blade tip vortex cavitation reduction system 10 through mass flow control according to the present invention is characterized by including a propeller 100, a water feeding pipe 200, a water supply/suction unit 300, and a controller 400.

Figure 2:
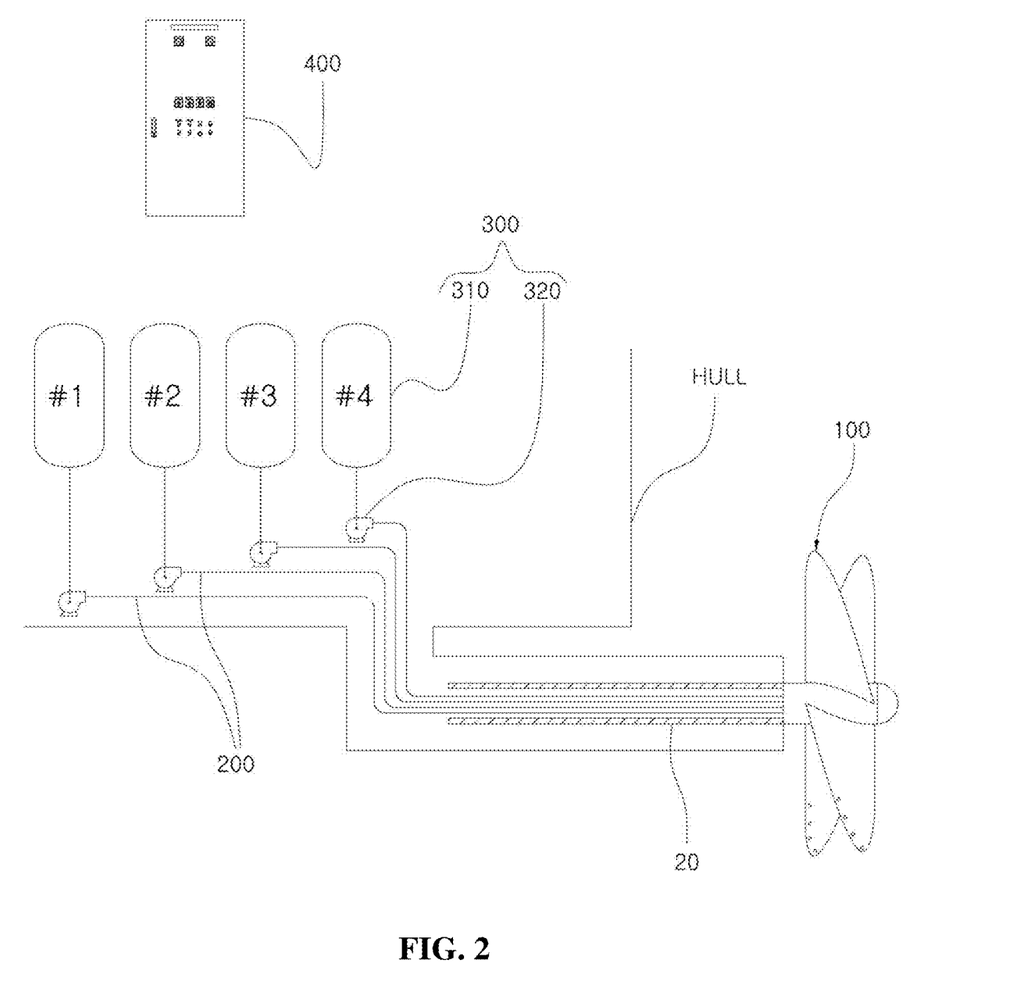
FIG. 2 is a view showing a detailed configuration of the present invention.

In detail, as shown in FIG. 2, the blade tip vortex cavitation reduction system 10 through mass flow control according to the present invention includes a propeller 100 configured to discharge water to the outside or suction outside water in order to reduce blade tip vortex cavitation occurring due to rotation thereof, a plurality of water feeding pipes 200 mounted in a propeller driving shaft 20 so as to match corresponding ones of blades of the propeller 100 in order to feed water to be discharged to the propeller 100 or feed water suctioned through the propeller 100 to water supply/suction units, a plurality of water supply/suction units 300 mounted in the hull so as to match corresponding ones of the blades of the propeller 100 in order to supply water to be discharged to the propeller 100 or suction water through the propeller 100 under the control of a controller 400, and a controller 400 configured to control the plurality of water supply/suction units 300 so that discharge and suction of water through the propeller 100 are implemented. The plurality of water feeding pipes 200 and the plurality of water supply/suction units 300 are provided in the same number as the blades of the propeller 100.

The propeller 100 is configured to discharge water to the outside or suction outside water in order to reduce blade tip vortex cavitation occurring due to rotation thereof.

The propeller 100 is a part that generates propulsive force in the water. The propeller 100 is connected to the propeller driving shaft 20 mounted in the bottom of the stern of the ship in order to propel the ship. The propeller 100 is rotated to generate propulsive force by rotation of the propeller driving shaft 20.

When the propeller 100 rotates in the water, blade tip vortex cavitation, which is a vortex of air bubbles, occurs around the propeller 100. Blade tip vortex cavitation causes underwater noise and vibration of the hull.

In order to reduce blade tip vortex cavitation, which causes underwater noise and vibration of the hull, it is necessary to weaken energy of a vortex of air bubbles, which is the blade tip vortex cavitation. To this end, water is discharged to or suctioned from a region in which the blade tip vortex cavitation, which is a vortex of air bubbles, occurs through the propeller 100.

The term "mass flow" used herein refers to a process of discharging water to the outside or suctioning outside water through the propeller 100.

FIG. 1 shows an example of discharging water to a region in which blade tip vortex cavitation occurs through the propeller 100 that is rotating.

Figure 3:
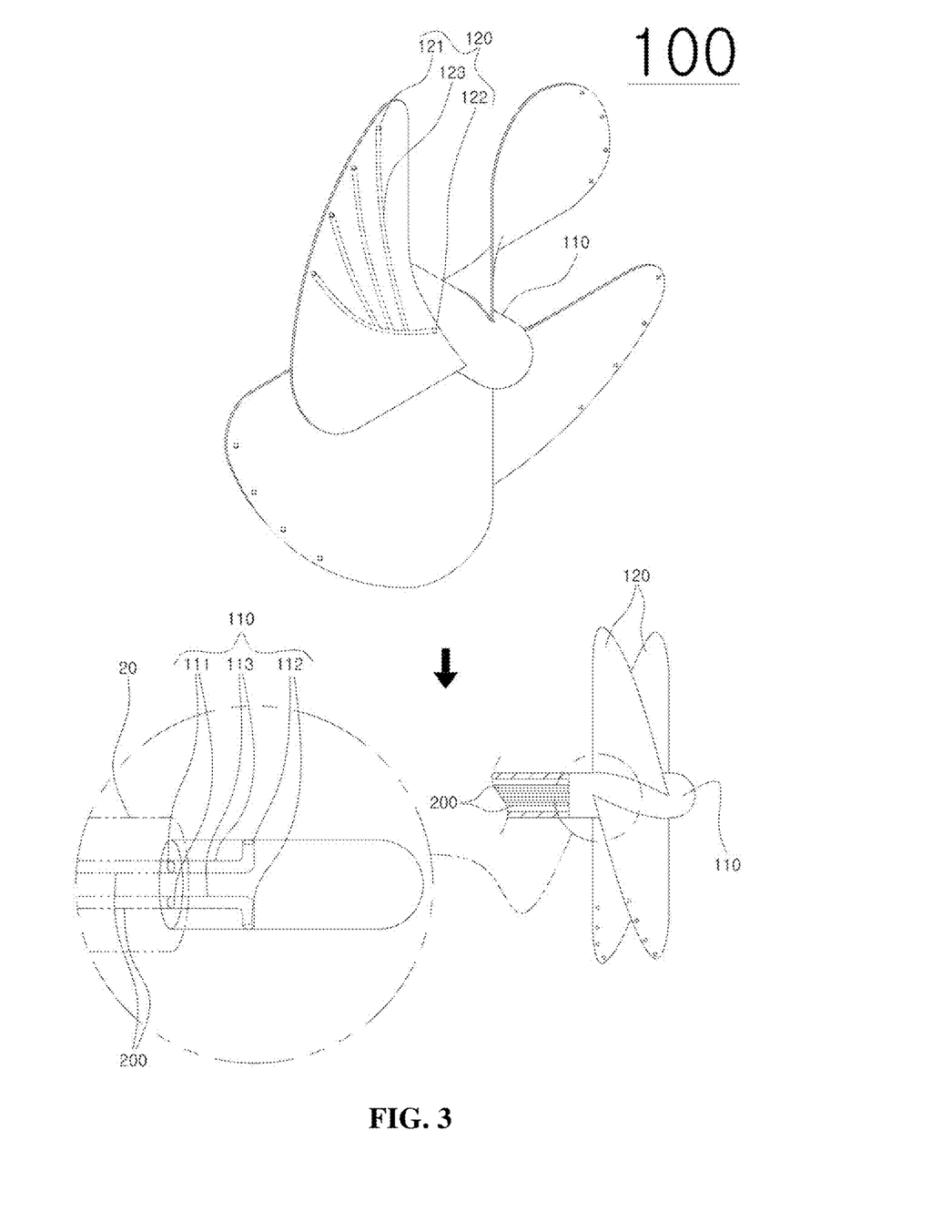
FIG. 3 is a view showing a detailed configuration of a propeller of the present invention.

In detail, as shown in FIG. 3, the propeller 100 includes a propeller hub 110, which is coupled to the propeller driving shaft 20 so as to rotate along with rotation of the propeller driving shaft 20 and to feed water to be discharged from the plurality of water feeding pipes 200 to a plurality of propeller blades 120 or feed water suctioned through the plurality of propeller blades 120 to the plurality of water feeding pipes 200, and a plurality of propeller blades 120, which are coupled to the outer peripheral surface of the propeller hub 110 so as to rotate along with rotation of the propeller hub 110 and to discharge water to the outside or suction outside water in order to reduce blade tip vortex cavitation.

The propeller hub 110 is a part that is coupled to the propeller driving shaft 20 so as to rotate along with rotation of the propeller driving shaft 20 and to guide water to be discharged from the plurality of water feeding pipes 200 to the plurality of propeller blades 120 or guide water suctioned through the plurality of propeller blades 120 to the plurality of water feeding pipes 200.

The plurality of propeller blades 120 is coupled to the side surface of the propeller hub 110, and the propeller driving shaft 20 is axially coupled to the front surface of the propeller hub 110, so that the propeller hub 110 rotates along with rotation of the propeller driving shaft 20.

In detail, as shown in FIG. 3, the propeller hub 110 includes a plurality of first connection holes 111 formed in the front surface of the propeller hub 110 so as to be connected to the plurality of water feeding pipes 200, a plurality of second connection holes 112 formed in the side surface of the propeller hub 110 so as to be connected to third connection holes 122 formed in the propeller blades 120 when the propeller blades 120 are coupled to the propeller hub 110, and a plurality of hub fluid moving passages 113 formed inside the propeller hub 110 to allow the plurality of first connection holes 111 and the plurality of second connection holes 112 to communicate with each other.

Referring to FIG. 3, the first connection holes 111 are holes formed in the front surface of the propeller hub 110 so as to be connected to the plurality of water feeding pipes 200.

That is, each of the water feeding pipes 200 is connected to a respective one of the first connection holes 111. Accordingly, water supplied through the water feeding pipes 200 (water to be discharged) is supplied to the hub fluid moving passages 113 through the first connection holes 111, or water supplied through the hub fluid moving passages 113 (water suctioned from the outside) is supplied to the water feeding pipes 200 through the first connection holes 111.

The second connection holes 112 are holes formed in the side surface of the propeller hub 110 so as to be connected to the third connection holes 122 formed in the propeller blades 120 when the propeller blades 120 are coupled to the propeller hub 110.

That is, when the propeller blades 120 are coupled to the propeller hub 110, the second connection holes 112 communicate with the third connection holes 122 formed in the propeller blades 120, whereby water supplied from the hub fluid moving passages 113 (water to be discharged) is supplied to the propeller blades 120 through the second connection holes 112, or water supplied from the propeller blades 120 (water suctioned from the outside) is supplied to the hub fluid moving passages 113 through the second connection holes 112.

The hub fluid moving passages 113 are internal passages formed inside the propeller hub 110 to allow the first connection holes 111 and the second connection holes 112 to communicate with each other.

Therefore, since each of the first connection holes 111 communicates with a respective one of the second connection holes 112 through a respective one of the hub fluid moving passages 113, water supplied from the plurality of water feeding pipes 200 (water to be discharged) is supplied to the plurality of propeller blades 120, or water supplied from the plurality of propeller blades 120 (water suctioned from the outside) is supplied to the plurality of water feeding pipes 200.

The plurality of propeller blades 120 is coupled to the outer peripheral surface of the propeller hub 110 so as to rotate along with rotation of the propeller hub 110 and to discharge water to the outside or suction outside water in order to reduce blade tip vortex cavitation. The plurality of propeller blades 120 coupled to the propeller hub 110 rotates along with rotation of the propeller driving shaft 20 to generate force required to propel the ship. When the propeller blades 120 rotate, blade tip vortex cavitation, which is a vortex of air bubbles, occurs around the propeller blades 120, causing underwater noise and vibration of the hull.

In order to reduce blade tip vortex cavitation, which causes underwater noise and vibration of the hull, it is necessary to weaken energy of a vortex of air bubbles, which is the blade tip vortex cavitation. To this end, water is discharged to or suctioned from a region in which the blade tip vortex cavitation, which is a vortex of air bubbles, occurs through the plurality of propeller blades 120.

In detail, as shown in FIG. 3, each of the plurality of propeller blades 120 includes a plurality of flow holes 121 formed therethrough and disposed along the tip thereof to discharge water to the outside or suction outside water, a third connection hole 122 formed in a portion thereof coupled to the propeller hub 110 so as to be connected to the second connection hole 112 formed in the side surface of the propeller hub 110 when each of the plurality of propeller blades 120 is coupled to the propeller hub 110, and a blade fluid moving passage 123 formed therein to allow the plurality of flow holes 121 and the third connection hole 122 to communicate with each other in order to feed water to be discharged to the outside through the plurality of flow holes 121 or feed water suctioned from the outside through the plurality of flow holes 121.

As shown in FIG. 3, the flow holes 121 are holes formed through each of the propeller blades 120 so as to be disposed along the tip of each of the propeller blades 120 in order to discharge water to the outside or suction outside water.

The plurality of flow holes 121 allows water supplied from the propeller hub 110 to be discharged to the outside of the propeller blades 120 therethrough, as shown in the enlarged view located at the upper part in FIG. 1, or allows outside water to be suctioned into the propeller blades 120 therethrough in order to reduce blade tip vortex cavitation.

The third connection hole 122 is a hole formed in a portion of each of the plurality of propeller blades 120 that is coupled to the propeller hub 110 so as to be connected to the second connection hole 112 formed in the side surface of the propeller hub 110 when each of the plurality of propeller blades 120 is coupled to the propeller hub 110.

That is, when each of the plurality of propeller blades 120 is coupled to the propeller hub 110, the third connection hole 122 communicates with a corresponding one of the plurality of second connection holes 112 formed in the propeller hub 120. Accordingly, water supplied from a corresponding one of the hub fluid moving passages 113 formed in the propeller hub 110 (water to be discharged) is supplied to the blade fluid moving passage 123 through the third connection hole 122, or water supplied from the blade fluid moving passage 123 (water suctioned from the outside) is supplied to a corresponding one of the hub fluid moving passages 113 formed in the propeller hub 110 through the third connection hole 122.

The blade fluid moving passage 123 is an internal passage formed in each of the propeller blades 120 to allow the plurality of flow holes 121 and the third connection hole 122 to communicate with each other in order to feed water to be discharged to the outside through the plurality of flow holes 121 or feed water suctioned from the outside through the plurality of flow holes 121.

In detail, the blade fluid moving passage 123 is a diverging-type passage including one end communicating with the third connection hole 122 and opposite ends communicating with the plurality of flow holes 121.

As such, since the flow holes 121 communicate with the third connection hole 122 through the diverging-type blade fluid moving passage 123, water supplied from the blade hub 110 (water to be discharged) is discharged to the outside, or water suctioned from the outside is supplied to the blade hub 110.

Referring to FIG. 2, the water feeding pipes 200 are pipes mounted in the propeller driving shaft 20 so as to match corresponding ones of the blades of the propeller 100 in order to feed water to be discharged to the propeller 100 or feed water suctioned through the propeller 100 to the water supply/suction units 300.

That is, the plurality of water feeding pipes 200 is provided in the same number as the blades of the propeller 100. For example, the water feeding pipe 200 matching the first blade is mounted in the propeller driving shaft 20, the water feeding pipe 200 matching the second blade is mounted in the propeller driving shaft 20, and the water feeding pipe 200 matching the $N^{th}$ blade is mounted in the propeller driving shaft 20.

One end of each of the water feeding pipes 200 is connected to a corresponding one of the plurality of first connection holes 111 formed in the propeller hub 110, and the other end thereof is connected to a pump 320 of a corresponding one of the water supply/suction units 300, which will be described later.

Therefore, when the pumps 320 of the water supply/suction units 300 perform discharge operation, water stored in storage tanks 310 of the water supply/suction units 300 is fed to the propeller 100 through the water feeding pipes 200, and when the pumps 320 of the water supply/suction units 300 perform suction operation, water suctioned through the propeller 100 is fed to the storage tanks 310 of the water supply/suction units 300 through the water feeding pipes 200.

The water supply/suction units 300 are parts mounted in the hull so as to match corresponding ones of the blades of the propeller 100 in order to supply water to be discharged to the propeller 100 or suction water through the propeller 100 under the control of the controller 400.

That is, the plurality of water supply/suction units 300 is provided in the same number as the blades of the propeller 100. For example, the water supply/suction unit 300 matching the first blade is mounted in the hull, the water supply/suction unit 300 matching the second blade is mounted in the hull, and the water supply/suction unit 300 matching the $N^{th}$ blade is mounted in the hull.

In detail, as shown in FIG. 2, each of the plurality of water supply/suction units 300 includes a storage tank 310, which stores water to be discharged to the outside through the propeller 100 and water suctioned from the outside through the propeller 100, and a pump 320, which generates, under the control of the controller 400, discharge force required to discharge the water stored in the storage tank 310 to the outside through the propeller 100 and suction force required to suction water from the outside through the propeller 100.

The storage tank 310 is a part having a predetermined size and capacity in order to store water to be discharged to the outside through the propeller 100 and water suctioned from the outside through the propeller 100, and is mounted in the hull.

The pump 320 is a part configured to generate, under the control of the controller 400, discharge force required to discharge the water stored in the storage tank 310 to the outside through the propeller 100 and suction force required to suction water from the outside through the propeller 100.

That is, the pump 320 is connected at one end thereof to the storage tank 310, and is connected at the other end thereof to a corresponding one of the water feeding pipes 200, and operates to generate discharge force or suction force under the control of the controller 400.

The controller 400 is a part mounted in the hull in order to control the plurality of water supply/suction units 300 so that discharge and suction of water through the propeller 100 are implemented. The controller 400 controls operation of the pump 320 that matches a corresponding one of the propeller blades 120 depending on the position of the corresponding propeller blade 120.

When the propeller blades 120 rotate, blade tip vortex cavitation, which is a vortex of air bubbles, occurs around the propeller blades 120, causing underwater noise and vibration of the hull.

In order to reduce blade tip vortex cavitation, which causes underwater noise and vibration of the hull, it is necessary to weaken energy of a vortex of air bubbles, which is the blade tip vortex cavitation. To this end, water is discharged to or suctioned from a region in which the blade tip vortex cavitation, which is a vortex of air bubbles, occurs through the plurality of propeller blades 120. Such discharge or suction of water through the propeller blades 120 is the main feature of the present invention.

The blade tip vortex cavitation, which is a vortex of air bubbles that occurs around the propeller blades 120 that rotate, has different intensities depending on regions.

Figure 4A:
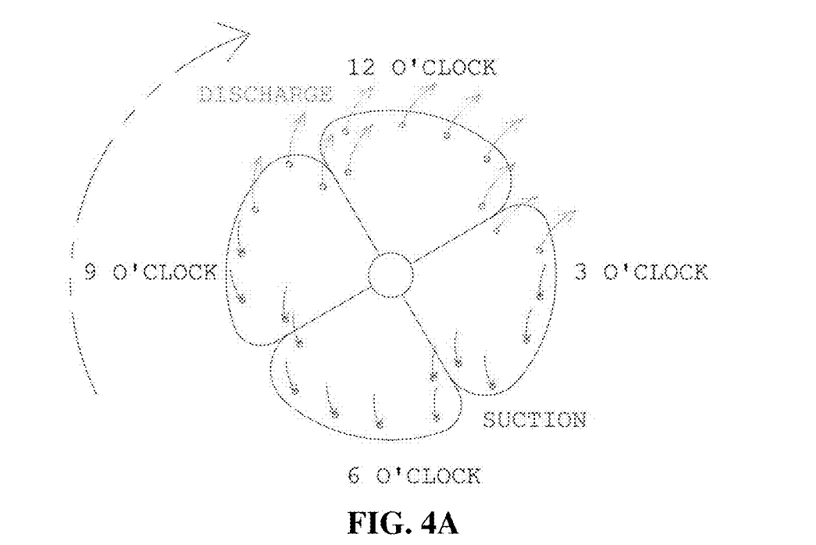
FIGS. 4A-4B are views showing an example of discharge/suction of water through propeller blades depending on the rotational direction of the propeller of the present invention.
Figure 4B:
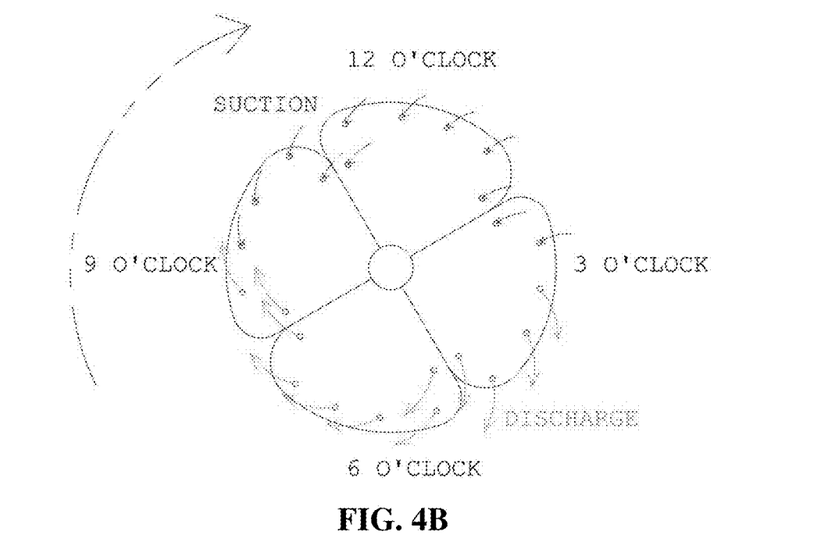

As shown in FIGS. 4A-4B, when the propeller 100 rotates to the right, a region from 9 o'clock to 3 o'clock of the propeller 100 when viewed from the propeller driving shaft 20 is a region in which the blade tip vortex cavitation has large intensity, and a region from 3 o'clock to 9 o'clock of the propeller 100 when viewed from the propeller driving shaft 20 is a region in which the blade tip vortex cavitation has small intensity. In particular, the blade tip vortex cavitation has the largest intensity in a 9 o'clock region.

Figure 5A:
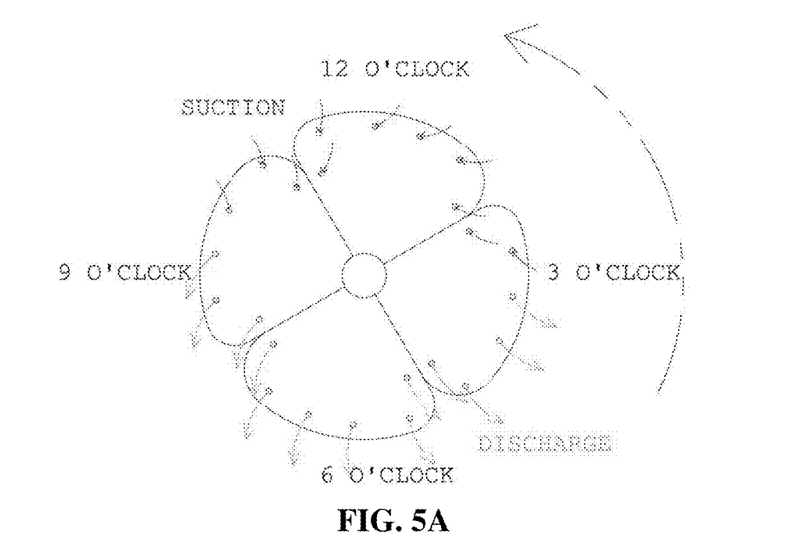
FIGS. 5A-5B are views showing another example of discharge/suction of water through the propeller blades depending on the rotational direction of the propeller of the present invention.
Figure 5B:
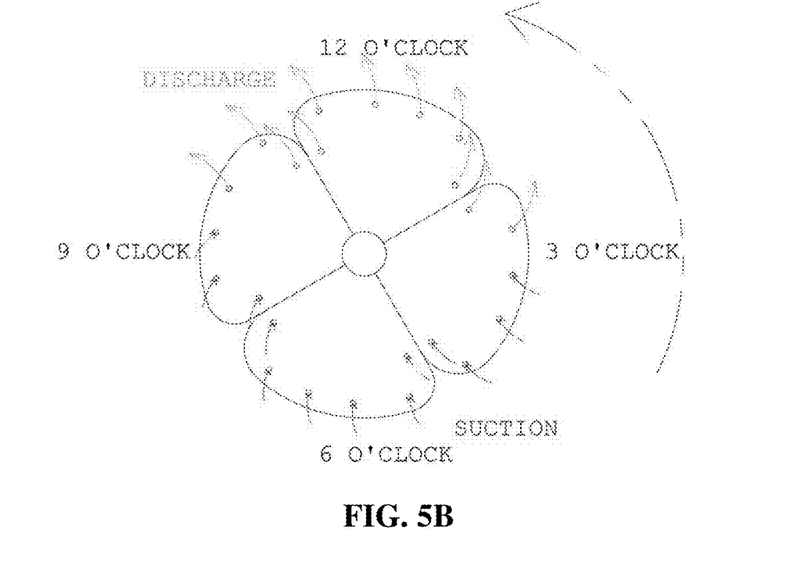

As shown in FIGS. 5A-5B, when the propeller 100 rotates to the left, a region from 3 o'clock to 9 o'clock of the propeller 100 when viewed from the propeller driving shaft 20 is a region in which the blade tip vortex cavitation has large intensity, and a region from 9 o'clock to 3 o'clock of the propeller 100 when viewed from the propeller driving shaft 20 is a region in which the blade tip vortex cavitation has small intensity. In particular, the blade tip vortex cavitation has the largest intensity in a 3 o'clock region.

Therefore, when the propeller 100 rotates, the controller 400 of the present invention controls the plurality of water supply/suction units 300 to discharge or suction water through the propeller 100 depending on the rotational position of the propeller 100.

In detail, during rotation of the plurality of propeller blades 120, the controller 400 operates the pump 320 of the water supply/suction unit 300 corresponding to a propeller blade 120 located in a region in which the blade tip vortex cavitation has large intensity to discharge water through the propeller blade 120 corresponding thereto, and operates the pump 320 of the water supply/suction unit 300 corresponding to a propeller blade 120 located in a region in which the blade tip vortex cavitation has small intensity to suction outside water through the propeller blade 120 corresponding thereto.

To the contrary, during rotation of the plurality of propeller blades 120, the controller 400 operates the pump 320 of the water supply/suction unit 300 corresponding to a propeller blade 120 located in a region in which the blade tip vortex cavitation has large intensity to suction outside water through the propeller blade 120 corresponding thereto, and operates the pump 320 of the water supply/suction unit 300 corresponding to a propeller blade 120 located in a region in which the blade tip vortex cavitation has small intensity to discharge water through the propeller blade 120 corresponding thereto.

As shown in FIGS. 4A-4B, when the propeller 100 rotates to the right, the controller 400 determines information about the rotational positions of the plurality of propeller blades 120.

Based on the information about the rotational positions of the plurality of propeller blades 120 determined during rotation of the plurality of propeller blades 120, the controller 400 operates the pump 320 of the water supply/suction unit 300 corresponding to a propeller blade 120 located in a region in which the blade tip vortex cavitation has large intensity (a region from 9 o'clock to 3 o'clock of the propeller 100 when viewed from the propeller driving shaft 20) to discharge water through the propeller blade 120 corresponding thereto, as shown in FIG. 4A, and operates the pump 320 of the water supply/suction unit 300 corresponding to a propeller blade 120 located in a region in which the blade tip vortex cavitation has small intensity (a region from 3 o'clock to 9 o'clock of the propeller 100 when viewed from the propeller driving shaft 20) to suction outside water through the propeller blade 120 corresponding thereto, as shown in FIG. 4A.

To the contrary, based on the information about the rotational positions of the plurality of propeller blades 120 determined during rotation of the plurality of propeller blades 120, the controller 400 operates the pump 320 of the water supply/suction unit 300 corresponding to a propeller blade 120 located in a region in which the blade tip vortex cavitation has large intensity (a region from 9 o'clock to 3 o'clock of the propeller 100 when viewed from the propeller driving shaft 20) to suction outside water through the propeller blade 120 corresponding thereto, as shown in FIG. 4B, and operates the pump 320 of the water supply/suction unit 300 corresponding to a propeller blade 120 located in a region in which the blade tip vortex cavitation has small intensity (a region from 3 o'clock to 9 o'clock of the propeller 100 when viewed from the propeller driving shaft 20) to discharge water through the propeller blade 120 corresponding thereto, as shown in FIG. 4B.

As shown in FIGS. 5A-5B, when the propeller 100 rotates to the left, the controller 400 determines information about the rotational positions of the plurality of propeller blades 120.

Based on the information about the rotational positions of the plurality of propeller blades 120 determined during rotation of the plurality of propeller blades 120, the controller 400 operates the pump 320 of the water supply/suction unit 300 corresponding to a propeller blade 120 located in a region in which the blade tip vortex cavitation has large intensity (a region from 3 o'clock to 9 o'clock of the propeller 100 when viewed from the propeller driving shaft 20) to discharge water through the propeller blade 120 corresponding thereto, as shown in FIG. 5B, and operates the pump 320 of the water supply/suction unit 300 corresponding to a propeller blade 120 located in a region in which the blade tip vortex cavitation has small intensity (a region from 9 o'clock to 3 o'clock of the propeller 100 when viewed from the propeller driving shaft 20) to suction outside water through the propeller blade 120 corresponding thereto, as shown in FIG. 5B.

To the contrary, based on the information about the rotational positions of the plurality of propeller blades 120 determined during rotation of the plurality of propeller blades 120, the controller 400 operates the pump 320 of the water supply/suction unit 300 corresponding to a propeller blade 120 located in a region in which the blade tip vortex cavitation has large intensity (a region from 3 o'clock to 9 o'clock of the propeller 100 when viewed from the propeller driving shaft 20) to suction outside water through the propeller blade 120 corresponding thereto, as shown in FIG. 5A, and operates the pump 320 of the water supply/suction unit 300 corresponding to a propeller blade 120 located in a region in which the blade tip vortex cavitation has small intensity (a region from 9 o'clock to 3 o'clock of the propeller 100 when viewed from the propeller driving shaft 20) to discharge water through the propeller blade 120 corresponding thereto, as shown in FIG. 5A.

Through the above-described discharge or suction of water through the propeller blades 120, it is possible to weaken energy of a vortex of air bubbles, which is blade tip vortex cavitation, thereby reducing underwater noise and vibration of the hull.

As is apparent from the above description, the blade tip vortex cavitation reduction system through mass flow control according to the present invention reduces blade tip vortex cavitation that occurs around blades of a propulsive propeller of a ship when the propulsive propeller rotates to generate force required to propel the ship across the sea by forming a plurality of flow holes in the propeller blades and controlling mass flow through the plurality of flow holes, i.e., appropriately discharging water to the outside or suctioning outside water through the plurality of flow holes, thereby reducing underwater noise and vibration of the hull.

Although the preferred embodiments of the present invention have been disclosed for illustrative purposes, those skilled in the art will appreciate that various modifications, additions and substitutions are possible, without departing from the scope and spirit of the invention as disclosed in the appended claims.

What is claimed is:

1. A system for reducing blade tip vortex cavitation by controlling mass flow, the system comprising:
   a propeller configured to discharge water to an outside or suction outside water in order to reduce blade tip vortex cavitation occurring due to rotation thereof;
   a plurality of water feeding pipes mounted in a propeller driving shaft so as to match corresponding ones of blades of the propeller in order to feed water to be discharged to the propeller or feed water suctioned through the propeller to a plurality of water supply/suction units;
   the plurality of water supply/suction units mounted in a hull so as to match the corresponding ones of the blades of the propeller in order to supply water to be discharged to the propeller or suction water through the propeller under control of a controller; and
   the controller configured to control the plurality of water supply/suction units so that discharge and suction of water through the propeller are implemented,
   wherein the plurality of water feeding pipes and the plurality of water supply/suction units are provided as the same number as the blades of the propeller.

2. The system according to claim 1, wherein the propeller comprises:
   a propeller hub coupled to the propeller driving shaft so as to rotate along with rotation of the propeller driving shaft and to feed water to be discharged from the plurality of water feeding pipes to the blades of the propeller or feed water suctioned through the blades to the plurality of water feeding pipes; and
   the blades coupled to an outer peripheral surface of the propeller hub so as to rotate along with rotation of the propeller hub and to discharge water to the outside or suction outside water in order to reduce the blade tip vortex cavitation.

3. The system according to claim 2, wherein the propeller hub comprises:
   a plurality of first connection holes formed in a front surface of the propeller hub so as to be connected to the plurality of water feeding pipes;
   a plurality of second connection holes formed in a side surface of the propeller hub so as to be connected to third connection holes formed in the blades when the blades are coupled to the propeller hub; and
   a plurality of hub fluid moving passages formed inside the propeller hub to allow the plurality of first connection holes and the plurality of second connection holes to communicate with each other.

4. The system according to claim 2, wherein each of the blades comprises:
   a plurality of flow holes formed therethrough and disposed along a tip thereof to discharge water to the outside or suction outside water;
   a third connection hole formed in a portion thereof so as to be connected to a second connection hole formed in a side surface of the propeller hub when each of the blades is coupled to the propeller hub; and
   a blade fluid moving passage formed therein to allow the plurality of flow holes and the third connection hole to communicate with each other in order to feed water to be discharged to the outside through the plurality of flow holes or feed water suctioned from the outside through the plurality of flow holes.

5. The system according to claim 4, wherein the blade fluid moving passage is a diverging passage comprising one end communicating with the third connection hole and opposite ends communicating with the plurality of flow holes.

6. The system according to claim 1, wherein each of the plurality of water supply/suction units comprises:
   a storage tank configured to store water to be discharged to the outside through the propeller and water suctioned from the outside through the propeller; and
   a pump configured to generate, under the control of the controller, discharge force required to discharge the water stored in the storage tank to the outside through the propeller and suction force required to suction water from the outside through the propeller.

7. The system according to claim 1, wherein, during rotation of the blades, the controller operates a pump of each of the plurality of water supply/suction units corresponding to one of the blades located in a region in which the blade tip vortex cavitation has a first intensity to discharge water through the one of the blades corresponding thereto, and operates another pump of each of the plurality of water supply/suction units corresponding to another of the blades located in a region in which the blade tip vortex cavitation has a second intensity to suction outside water through the another of the blades corresponding thereto, wherein the first intensity is greater than the second intensity.

8. The system according to claim 7, wherein, when the propeller rotates to right, the region in which the blade tip vortex cavitation has the first intensity is a region from 9 o'clock to 3 o'clock of the propeller when viewed from the propeller driving shaft,
   wherein, when the propeller rotates to left, the region in which the blade tip vortex cavitation has the first intensity is a region from 3 o'clock to 9 o'clock of the propeller when viewed from the propeller driving shaft,
   wherein, when the propeller rotates to the right, the region in which the blade tip vortex cavitation has the second intensity is the region from 3 o'clock to 9 o'clock of the propeller when viewed from the propeller driving shaft, and
   wherein, when the propeller rotates to the left, the region in which the blade tip vortex cavitation has the second intensity is the region from 9 o'clock to 3 o'clock of the propeller when viewed from the propeller driving shaft.

9. The system according to claim 1, wherein, during rotation of the blades, the controller operates a pump of each of the plurality of water supply/suction units corresponding to one of the blades located in a region in which the blade tip vortex cavitation has a first intensity to suction outside water through the one of the blades corresponding thereto, and operates another pump of each of the plurality of water supply/suction units corresponding to another of the blades located in a region in which the blade tip vortex cavitation has a second intensity to discharge water through the another of the blades corresponding thereto, wherein the first intensity is greater than the second intensity.

10. The system according to claim 9, wherein, when the propeller rotates to right, the region in which the blade tip vortex cavitation has the first intensity is a region from 9 o'clock to 3 o'clock of the propeller when viewed from the propeller driving shaft,
   wherein, when the propeller rotates to left, the region in which the blade tip vortex cavitation has the first intensity is a region from 3 o'clock to 9 o'clock of the propeller when viewed from the propeller driving shaft,
   wherein, when the propeller rotates to the right, the region in which the blade tip vortex cavitation has the second intensity is the region from 3 o'clock to 9 o'clock of the propeller when viewed from the propeller driving shaft, and
   wherein, when the propeller rotates to the left, the region in which the blade tip vortex cavitation has the second intensity is the region from 9 o'clock to 3 o'clock of the propeller when viewed from the propeller driving shaft.

* * * * *